United States Patent [19]
Feichtinger

[11] Patent Number: 5,771,594
[45] Date of Patent: Jun. 30, 1998

[54] ANGULAR ENCODER

[75] Inventor: Kurt Feichtinger, Palling, Germany

[73] Assignee: Johannes Heidenhain GmbH, Traunreut, Germany

[21] Appl. No.: 681,053

[22] Filed: Jul. 22, 1996

[30]  Foreign Application Priority Data

Aug. 5, 1995 [DE] Germany .......................... 195 34 063.9
  May 23, 1996 [EP] European Pat. Off. ............. 96108240

[51] Int. Cl.⁶ .................................................. G01D 5/34
[52] U.S. Cl. ........................ 33/1 PT; 33/572; 250/231.13
[58] Field of Search ..................................... 33/1 PT, 1 N, 33/706, 707, 708, 572; 250/231.13, 231.14, 231.18

[56]  References Cited

U.S. PATENT DOCUMENTS

| 4,386,270 | 5/1983 | Ezekiel | 250/231.13 |
| 4,472,713 | 9/1984 | Breslow | 250/231.14 |
| 5,018,397 | 5/1991 | Matich | 33/1 PT |

FOREIGN PATENT DOCUMENTS

| 8915109 | 4/1990 | Germany . |
| 3206875 | 5/1993 | Germany . |
| 148916 | 9/1987 | Japan . |
| 155313 | 10/1987 | Japan . |
| 156822 | 10/1987 | Japan . |
| 285711 | 9/1988 | Japan . |
| 62138 | 6/1992 | Japan . |

*Primary Examiner*—Thomas B. Will
*Attorney, Agent, or Firm*—Anderson Kill & Olick, P.C.

[57]  ABSTRACT

An angular encoder for determining an angular position between a stationary element and an element rotatable relative to the stationary element and including a coupling for connecting a scanning unit with a stationary element and formed of a spring material, with the coupling having at least two plates which extend transverse to each other and one of which extends parallel to a rotational axis of the rotatable element, and with each of the two plates having a plurality of leaf spring arms which are so formed and aligned that the leaf spring arms extend in directions of their respective application lines in which directions forces are applied to the coupling during rotation of the rotatable element relative to the stationary element.

8 Claims, 5 Drawing Sheets

ANGULAR ENCODER

BACKGROUND OF THE INVENTION

The present invention relates to an angular encoder for determining an angular position between a stationary element and an element rotatable relative to the stationary element, and which comprises a measuring standard associated with the relatively rotatable element, a scanning unit for scanning the measuring standard, and a coupling for connecting the scanning unit with the stationary element without a possibility of the scanning unit being twisted with respect to the stationary element but with a possibility of displacement of the scanning unit in radial and axial directions.

An angular encoder of the above-described type is disclosed, e.g., in German Utility Model DE 89 15 109 U1 and German patent No. 3,206,875. A drawback of the known angular encoder consists in that it, while preventing relative rotation between the encoder and the stationary element, requires the application of relatively large forces for effecting necessary radial and axial adjustments. These forces act on the support elements of the encoder and the drive and reduce the service life of both.

A coupling for connecting a stationary element with an encoder is also disclosed in Japanese publications JP62-156822U, JP62-148916U, JP62-155313U, JP6-2138U, and JP2-85711A. The couplings shown in these publications consist primarily of a plurality of leaf spring arms arranged in a single plane. However, they do not insure a torsion-proof and force-free connection with a possibility of axial and radial adjustment.

Accordingly, an object of the invention is a compact angular encoder which would insure a simple and wear-proof connection of the encoder with the measured element and which would also insure a high measurement accuracy.

SUMMARY OF THE INVENTION

This and other objects of the invention, which will become apparent hereinafter, are achieved by providing an angular encoder in which the coupling is formed of a spring material and has at least two plates which extend transverse to each other and one of which extends parallel to a rotational axis of the rotatable element, and each of the at least two plates has a plurality of leaf spring arms which are so formed and aligned that the leaf spring arms extend in directions of their respective application lines in which directions forces are applied to the coupling during rotation of the rotatable element relative to the stationary element.

A particular advantage of the present invention consists in that the coupling occupies very little space and insures a friction-free precise angle transmission between the two associated elements, while also providing for substantially force-free adjustment in radial and axial directions.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
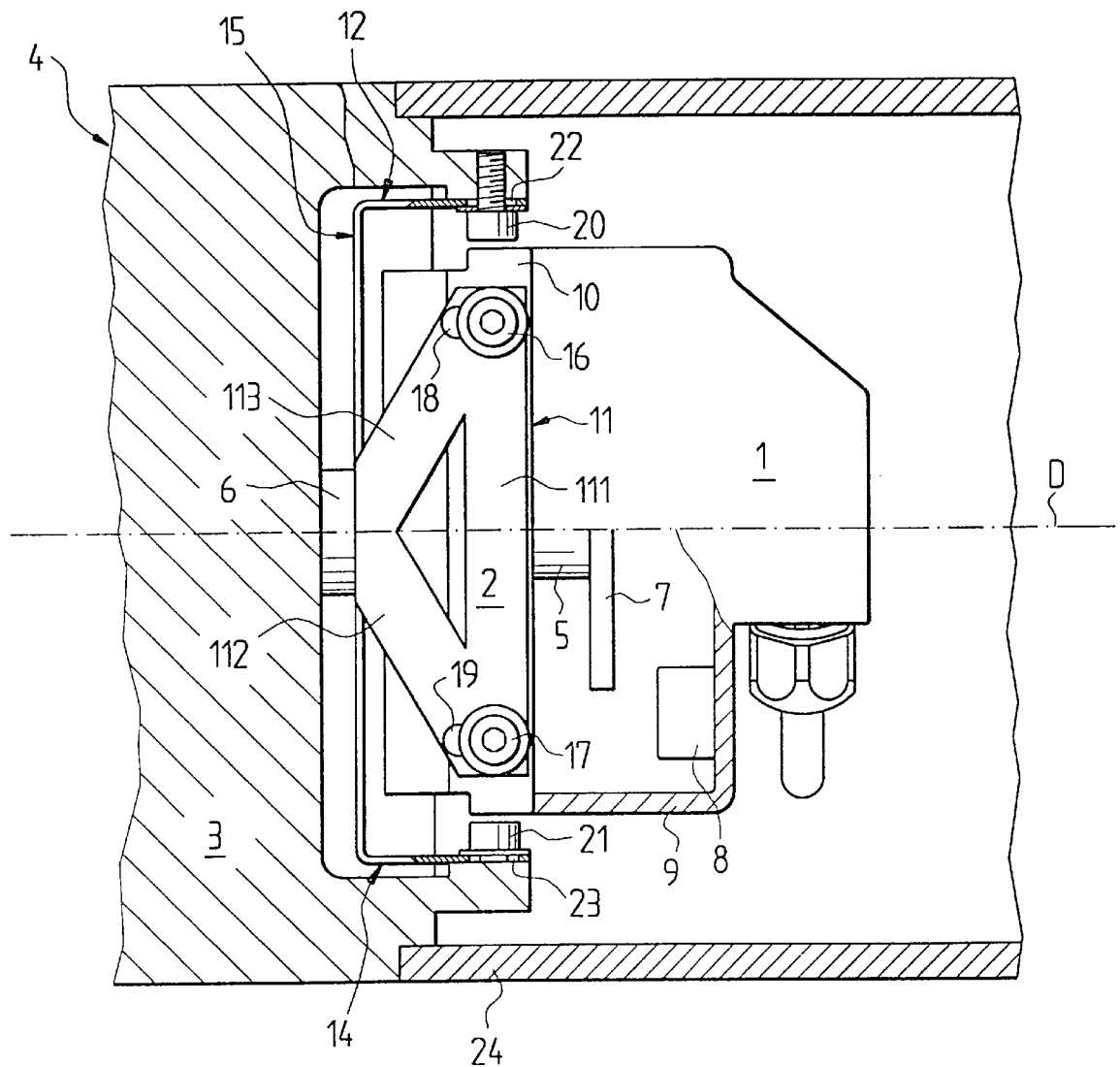
FIG. 1 is a cross-sectional view of an angular encoder according to the present invention.

FIG. 1 shows an angular encoder 1 which is connected with a stationary element 3 of a drive 4 by a coupling 2. A shaft 5 of the angular encoder 1 is rigidly connected with a shaft 6 of the drive 4. The angular encoder 1 measures an angular position of the shaft 6 relative to the stationary element 3 of the drive 4. The angular encoder 1 comprises a measuring standard formed as a graduation disc 7 supported on the shaft 5 of the angular encoder 1. The graduation disc 7 is scanned, in per se known manner, by a scanning unit 8. In the angular encoder, which is shown in FIG. 1, the scanning unit 8 is fixedly mounted on a housing 9 of the angular encoder 1, with the housing 9 itself being fixedly secured on a mounting flange 10 of the angular encoder 1. The coupling 2 is designed for attaching the angular encoder 1 to the stationary element so that any possibility of twisting of the angular encoder 1 relative to the stationary object 3 is eliminated but displacement of the angular encoder radially and axially relative to the stationary element 3 is possible.

Figure 2:
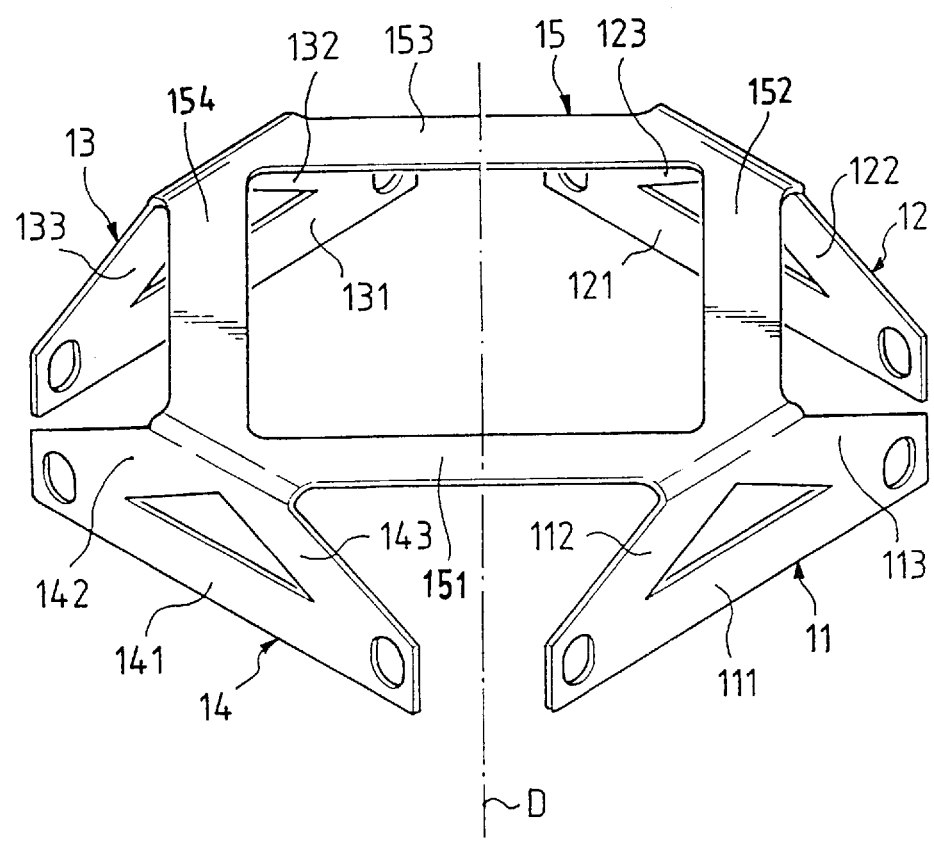
FIG. 2 is a perspective view of a coupling for the angular encoder shown in FIG. 1.

The coupling 2 is formed as a bent stamping from a material with a high fatigue limit, e.g., from a spring steel. The coupling 2, a perspective view of which is shown in FIG. 2, includes four flat plates 11, 12, 13 and 14 which extend, at least approximately, parallel to a common axis D of shafts 5 and 6, with respective plates 11, 13 and 12, 14 extending parallel to each other thus forming respective parallel guides. The plates 11, 12 and 13, 14 extend relative to each other at a right angle, whereby there are provided two parallel guides extending at a right angle relative to each other. The two parallel guides provide for a deviation of the angular encoder 1 relative to the stationary element 3 in all of the radial directions. All of the plates 11 through 14 are connected at one of their end with a further plate 15. The plate 15 is located in a plane, which extends transverse to the axis D, and provides for axial displacement of the angular encoder 1 relative to the stationary element 3. Free ends of a first pair of parallel plates 11 and 13 are secured to the mounting flange 10 with screws 16, 17 extending through slots 18, 19 provided in the plates 11 and 13, respectively. The free ends of another pair of parallel plates 12, 14 are secured to the stationary element 3 with screws 20, 21 extending through slots 22, 23 provided in the plates 12 and 14, respectively. A housing 24 surrounds both the drive 4 and the coupling 2. The stationary element 3 can represent, e.g., a stationary part of a motor. The mounting flange is a stationary part of the angular encoder. As a mounting element, both the encoder housing 9 and the support of the scanning unit 8 can be used.

Figure 3:
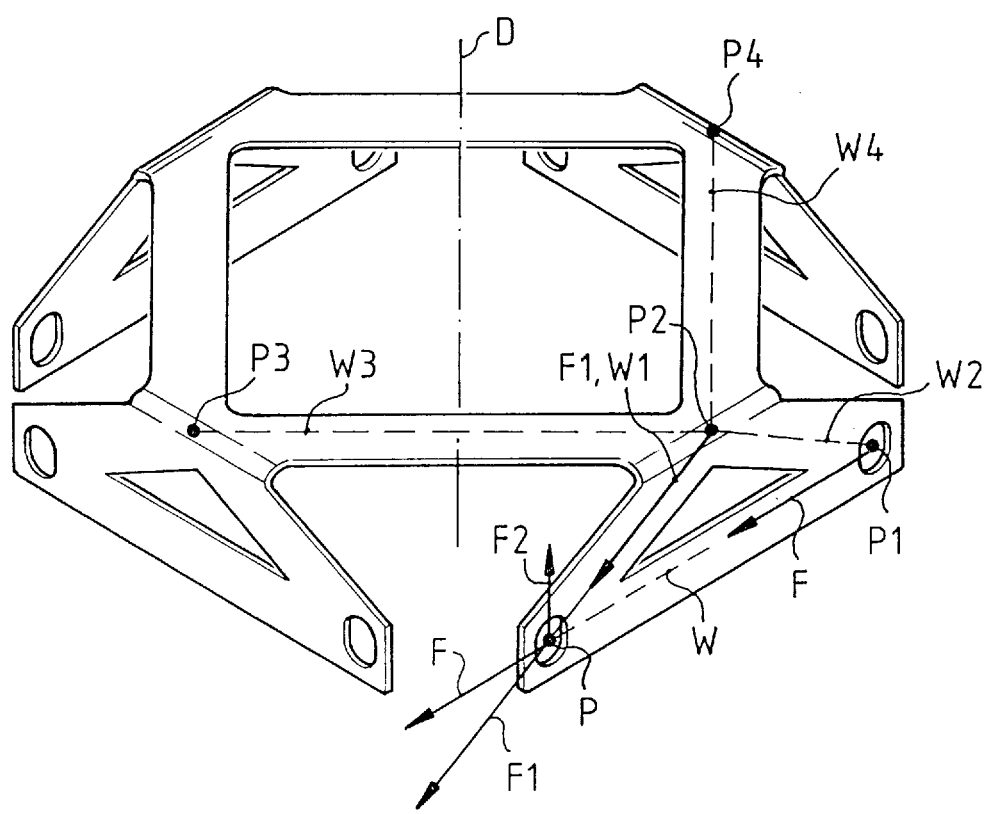
FIG. 3 is a perspective view showing the coupling of FIG. 2 with a force diagram.

According to the present invention each of the plates 11–15 has several leaf spring arms, namely, 111–113, 121–123, 131–133, 141–143 and 151–154, respectively, which are so formed and aligned that they extend in a direction of their respective application lines W, in which directions forces F are applied to the coupling 2 during the rotation of the shaft 6. An explanation of the force relationship will be made with reference to FIG. 3, which shows the application lines W. At that, it is assumed that the lower end of the plate 11 is attached to the mounting flange 10 of the angular encoder 1. When the shaft 5 is twisted relative to the shaft 6, a force F is applied to the coupling 2 at points P and P1. This force F is transmitted by the coupling 2 to the stationary element 3 of the drive. This transmission is effected from the plate 11 via point P2 to the plate 15 and from the plate 15 via other connection regions, designated with points P3 and P4, to the plates 12 and 14. Thus, the force F applied to the point P is divided into two forces F1 and F2. The application line W1 of the force F1 passes through points P and P2, and the application line W2 passes through points P1 and P2. The application lines W, W1 and W2 form a triangle. The leaf spring arms 111–113 of the plate 11 extend along the application lines W, W1 and W2. They are formed as narrow as possible so that their outer contours extend parallel to respective application lines as much as possible. Because the attachment of the plate 11 is effected along the application line W, this leaf spring arm 111 can be omitted.

The force F1, acting in the point P2 in the direction of the application line W1, is again divided and should be absorbed by the plate 15. The possible application lines, along which the force F1 can act, are designated as W3 and W4. The leaf spring arms 151 and 152 extend along the application lines W3 and W4. The plate 15 has a central, approximately square opening surrounded by arms 151–154 which form a frame. Thus, the leaf spring arms form a quadrangle.

The advantage of forming all the plates 11–15 as a framelike structure consists in that the coupling 2 is extremely resistant to twisting, while enabling radial and axial compensating displacements of the angular encoder 1 relative to the shaft 6, without generating a substantial restoring force. In the coupling 2 according to the present invention, the bent cross-sectional shape or the flexural strength of the plates 11–15 of the coupling 2 is minimal while the torsion resistance is maximal.

It is especially advantageous when the coupling 2 is formed as a symmetrical structure in which all four plates 11–14 have each three leaf spring arms 111–113, 121–123, 131–133, and 141–143 forming respective triangles. Each of the four plates 11–14 has a respective slot or openings 18, 19, 22 and 23. The longitudinal axes of plates 11–14 extend parallel to the rotational axis D of the shaft 6. The plates 11–14 provide for adjustment of the relative position of the angular encoder 1 relative to the drive 4.

Figure 4:
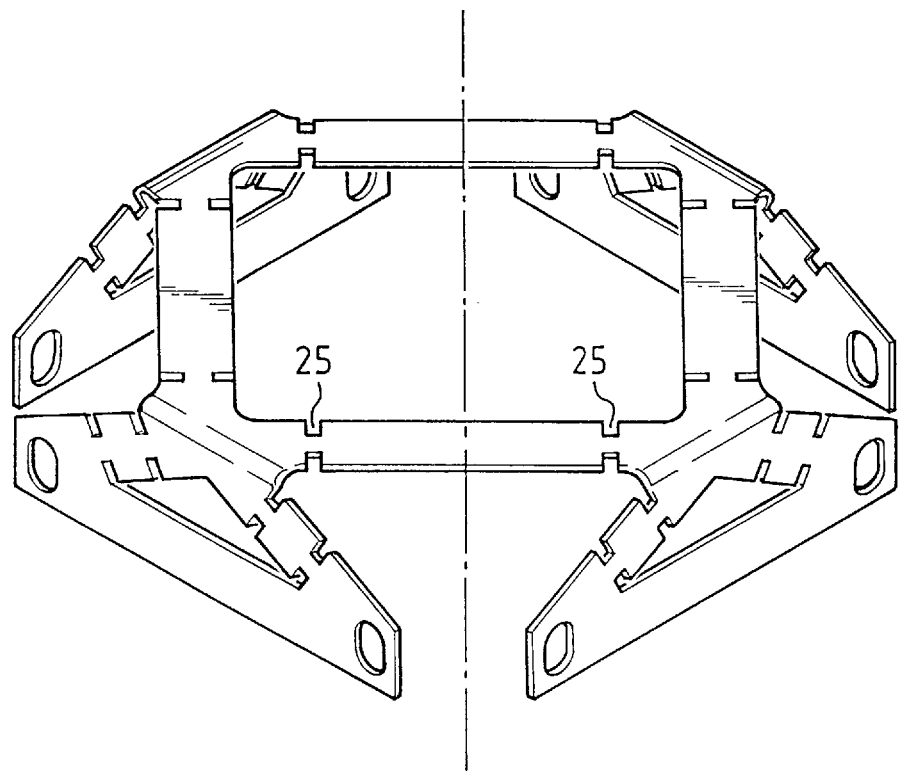
FIG. 4 is a perspective view of another embodiment of a coupling for an angular encoder according to the present invention.

FIG. 4 shows an embodiment of a coupling 2 in which the leaf spring arms 111–113, 121–123, 131–133, and 151–153 are provided with notches 25 formed in directions of the desired degree of freedom (radially and axially relative to the axis D) to give the frame structure formed by respective leaf spring arms a maximally possible flexibility.

Figure 5:
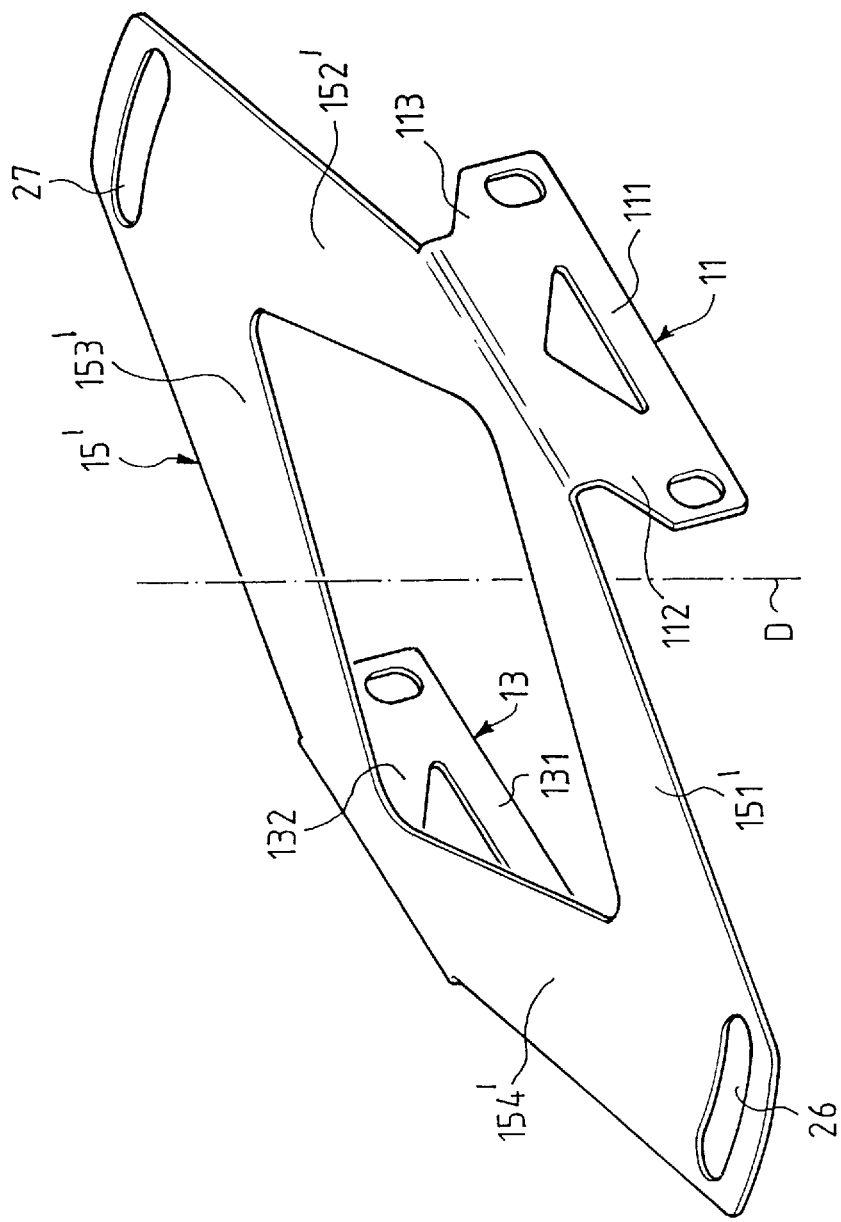
FIG. 5 is a perspective view of a further embodiment of a coupling for an angular encoder according to the present invention.

Another embodiment of the coupling 2 is shown in FIG. 5. In the coupling 2 shown in FIG. 5, two plates, which extend parallel to each other and parallel to the axis D and which correspond to respective plates of the coupling shown in FIG. 2, will be assigned the same reference numerals as the respective plates in FIG. 2, namely, 11 and 13. The free ends of the plates 11 and 13 of coupling 2 shown in FIG. 5 are designed for attaching the coupling 2 to the mounting flange 10 of the angular encoder 1. The main difference between the coupling shown in FIG. 5 and that shown in FIG. 2 consists in that the coupling of FIG. 5 has no further plates extending parallel to the axis D. For attaching the coupling 2 to the drive 4, free ends of the plate 15' are used. The leaf spring arms 151', 152', 153' and 154' of the plate 15' lie in a plane extending transverse to the axis D. The plate 15' of the coupling is provided at diametrically opposite free ends thereof with slots 26, 27 which serve for attaching the coupling to the drive 4. These slots are arranged at an angle of 90° to the plates 11 and 13.

The coupling 2 formed according to the present invention permits the angular encoder 1 to follow the wobbling of the shaft 6 of the drive 4, without mutual twisting of the scanning unit 8 and the stationary element 3 of the drive 4 at least with respect to the common axis D. This insures a very high precision of the measuring of the angular position without the generation of a constraining force, while providing for a rigid connection between the shafts of the angular encoder 1 and the shaft 6 of the drive 4, which practically can never be perfectly aligned. The coupling according to the present invention permits to compensate the eccentricity of the shafts 5 and 6 and their angular misalignment substantially force-free.

As discussed, in FIG. 1, the coupling 2 is arranged between a stationary element 3 and the mounting flange 10 of the angular encoder 1. However, the coupling can also be arranged inside of the angular encoder 1 between the scanning unit 8 and the mounting flange 10 or between the scanning unit 8 and the housing 24. The coupling can also be used in an angular encoder without a housing 9 and/or mounting flange 10.

The coupling according to the present invention can be formed only of two plates extending, respectively, parallel and transverse to the shaft axis. In this case, a free end of one of the plates is attached to a stationary element of the drive, and a free end of another plate is attached to the mounting flange or to the scanning unit of the angular encoder. Each of the two plates is formed of leaf spring arms forming a triangle, with respective two leaf spring arms of one plate intersecting, in the connection region of the two plates, each other. The free ends, of the plates, which are located opposite to the intersection point serve as attachment points, as it was explained with reference to plate 11–14 of the coupling shown in FIG. 2.

Generally, several couplings 2 can be provided along a circumference of the mounting flange of an angular encoder.

As an angular encoder, an incremental shaft encoder, preferably an optical-electrical encoder, an absolute encoder, a multiturn encoder, or a resolver can be used. Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An angular encoder for determining an angular position between a stationary element and an element rotatable relative to the stationary element, the angular encoder comprising:

a measuring standard associated with the relatively rotatable element;

a scanning unit for scanning the measuring standard; and a coupling for connecting the scanning unit with the stationary element without a possibility of the scanning unit being twisted with respect to the stationary element but with a possibility of displacement of the scanning unit in radial and axial directions;

wherein the coupling is formed of a spring material and has at least two plates which extend transverse to each other by, one of which extends parallel to a rotational axis of the rotatable element and the other extends transverse to the rotational axis and of the rotatable element, and wherein each of the at least two plates has a plurality of leaf spring arms which are so formed and aligned that the leaf spring arms extend in directions of respective application lines thereof in which directions forces are applied to the coupling during rotation of the rotatable element relative to the stationary element.

2. An angular encoder as set forth in claim 1, wherein the outer contours of the leaf spring arms extend substantially parallel to the respective application lines.

3. An angular encoder as set forth in claim 1, wherein the coupling is formed as a one-piece part.

4. An angular encoder as set forth in claim 1, wherein the coupling comprises a plurality of plates extending parallel to each other and forming a parallel guide, the plates, which extend parallel to each other, extend substantially parallel to the rotational axis of the rotatable element and are connected with each other by the plate extending transverse to the rotational axis.

5. An angular encoder as set forth in claim 4, wherein the coupling has two plates extending parallel to each other and parallel to the rotational axis of the rotatable element, wherein the two parallel plates are connected, at respective one ends thereof, to one of the scanning unit and the stationary element and are connected at respective ends thereof, which are opposite to the one ends, with the plate, which extends transverse to the rotational axis of the rotatable element, and wherein the transversely extending plate is connected in diametrically opposite regions thereof to the other one of the stationary element and the scanning unit.

6. An angular encoder as set forth in claim 4, wherein the coupling has four plates which extend parallel to the rotational axis of the rotatable element and which form two spring parallelograms extending perpendicular to each other, wherein respective one ends of the four plates are connected with the plate, which extends transverse to the rotational axis of the rotatable element, and wherein other respective ends of two opposite plates extending parallel to each other are connected to the scanning unit, and respective other ends of two other opposite plates extending parallel to each other are connected to the stationary element.

7. An angular encoder as set forth in claim 1, wherein the leaf spring arms of the plate, which extends parallel to the rotational axis of the rotatable element form a triangle, wherein a side of the triangle is connected at a free end thereof to one of the stationary element and the scanning unit, and wherein an apex of the triangle, which is located opposite the side connected to the one of the scanning unit and the stationary element, is located at least in a vicinity of a connection region of the parallel plate with the other plate which extends transverse to the rotational axis of the rotatable element.

8. An angular encoder as set forth in claim 7, wherein the transversely extending plate is formed of four leaf spring arms forming a quadrangle, and wherein two of the four leaf spring arms are connected, in an apex region of the triangle, with the two leaf spring arms of the parallel plate.

* * * * *